Oct. 22, 1957 W. H. KUNTZ 2,810,582
ANNUNCIATOR
Filed May 28, 1954 3 Sheets-Sheet 2
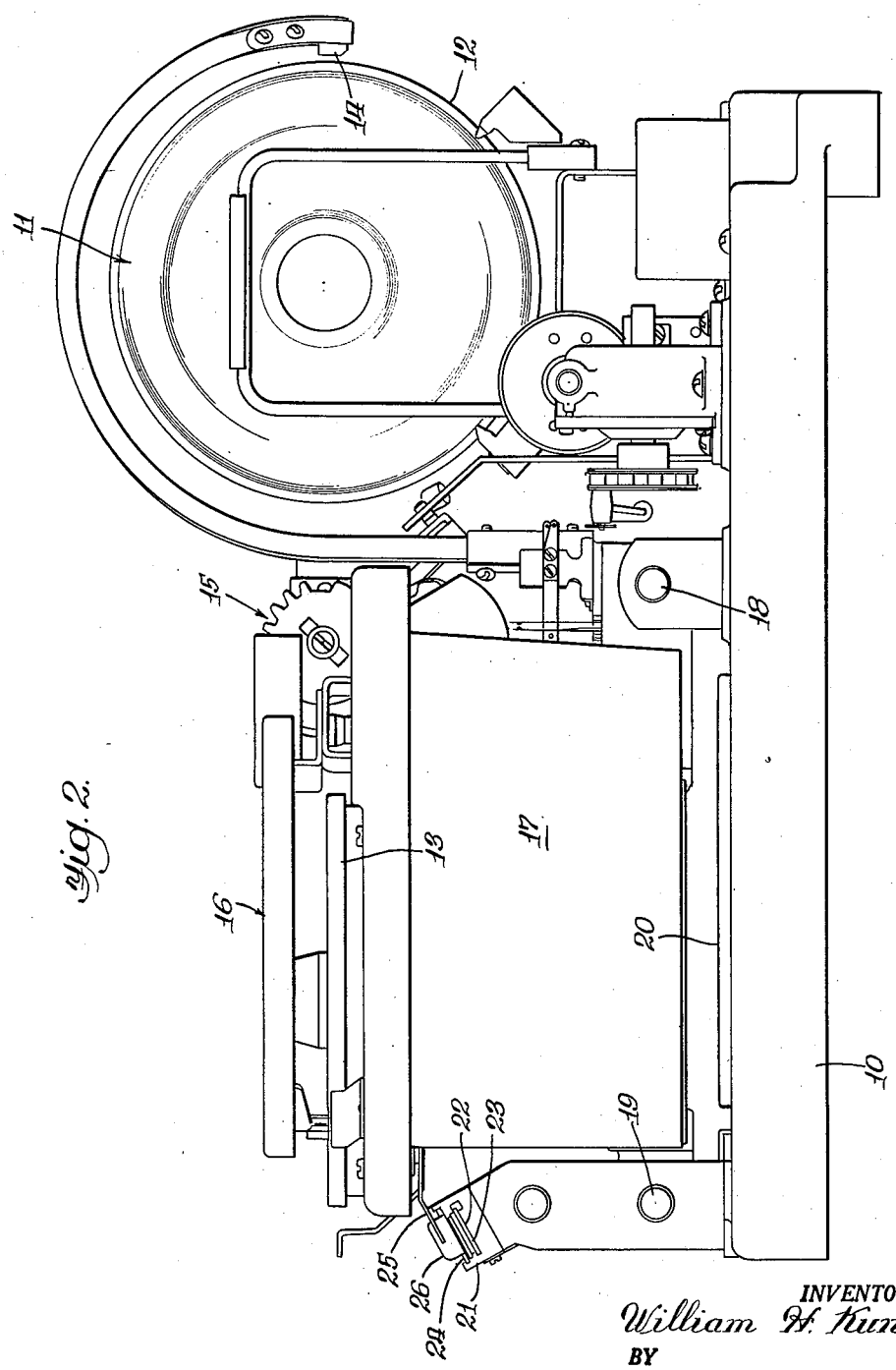
INVENTOR.
William H. Kuntz
BY
L. F. Hammard.
Atty.

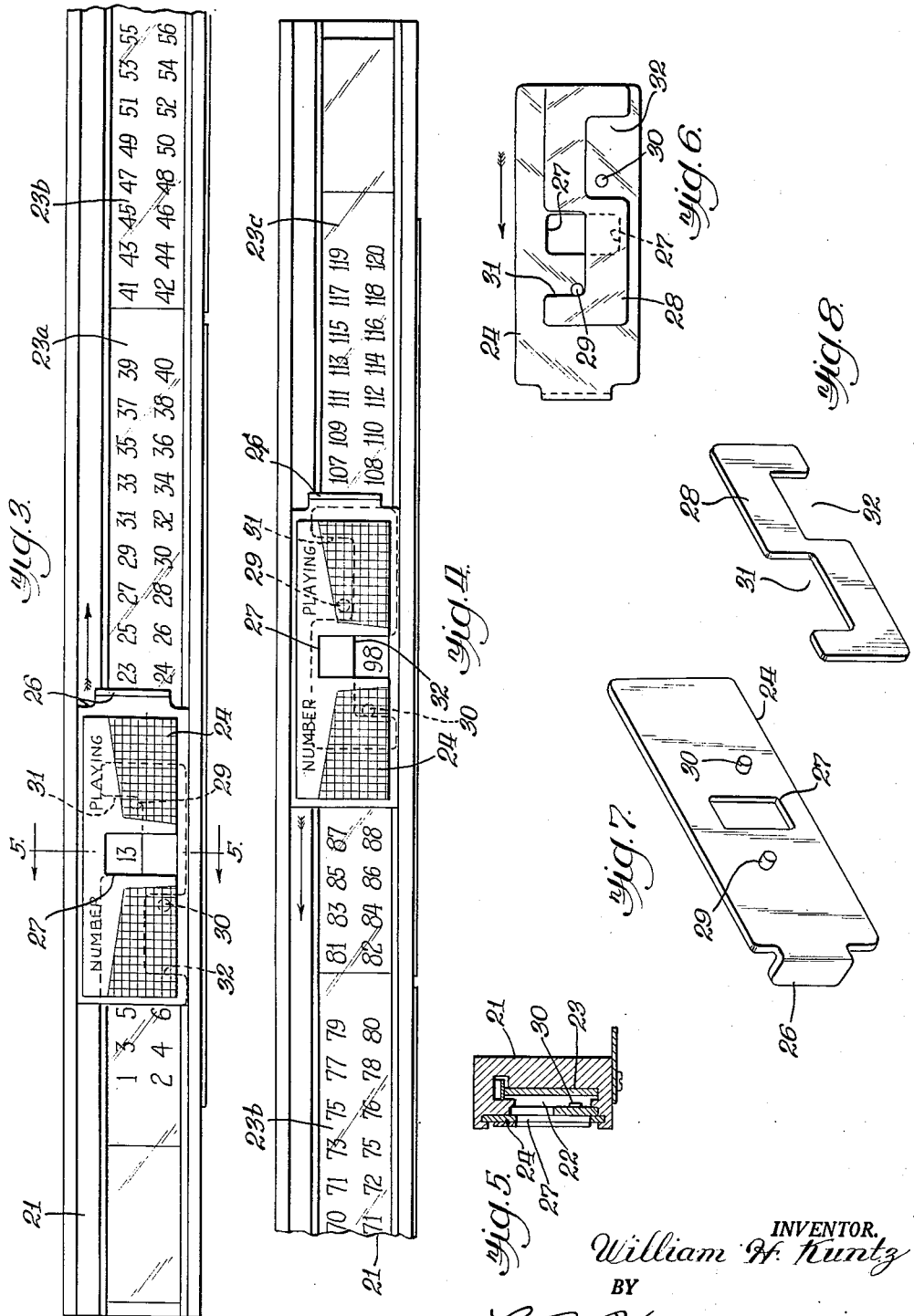

2,810,582
ANNUNCIATOR

William H. Kuntz, Grand Rapids, Mich., assignor to AMI Incorporated, Grand Rapids, Mich., a corporation of Delaware Application May 28, 1954, Serial No. 432,995

5 Claims. (Cl. 274—10)

The invention relates to an annunciator particularly suited for use in connection with the record changer of an automatic phonograph, so that patrons of establishments in which such phonographs are in use may observe the operation of the phonograph and visually determine the identification of any selection being played thereon.

It has been customary to provide some form of annunciator in such automatic record changers, but in many instances the mechanisms involved have been quite complex mechanically, or have involved the use of electrical apparatus such as lights, commutators, switches, etc. Consequently, most prior art annunciators have been unduly expensive, as well as being quite subject to mechanical or electrical failure.

It is therefore the principal object of the present invention to provide an annunciator for an automatic record changer wherein the entire mechanism is extremely simple, durable, fool-proof and rugged, so that it is entirely dependable and unlikely to get out of order or to require service.

A further object of the invention is to provide a simplified annunciator for automatic record changers wherein the annunciating function is accomplished wholly by mechanical means, without the necessity of any electrical parts or mechanism. Obviously, this eliminates troubles heretofore experienced with short circuits, faulty contacts, burned out lamp bulbs, and similar electrical difficulties commonly encountered in other machines.

A further object of the invention is to provide a mechanical annunciator for record changers adapted to play both faces of the records therein, wherein the annunciator is so arranged as to give a reliable indication as to whether the selection on the front or back face of the record is being played, yet to accomplish this desirable result without need for any direct connections between the record turning mechanism and the annunciator.

The foregoing objects are accomplished in the present invention by the provision of a mechanical annunciator which, in the form illustrated in the present specification, consists of a longitudinally extending dial, with two parallel rows of numerals disposed along the dial to afford two separate numerals for each record, identifying the selections recorded on the front and back faces of the records, respectively. As shown, the dial is of a length generally corresponding to the length of the record magazine of the machine on which the annunciator is installed, and the numerals are at spacings corresponding to the spacings of the records. An indicator is movable longitudinally along the dial into positions corresponding to the position of the individual records, and is arranged to expose a numeral in one row when the front of the record is being played, and to expose the other during playing of the back side. To this end, the indicator is provided with a shifting mechanism whereby an aperture in the indicator is caused to register with a numeral in one row when brought to its position by relative movement in one direction along the dial, and to register with a numeral indicating the back face of the record in response to opposite relative movement.

A present preferred embodiment of the invention is illustrated in drawings attached hereto, wherein:

Figure 2 is an end elevational view of the mechanism illustrated in Figure 1;

Figure 3 is an enlarged fragmental face view of the dial of the mechanism showing the parts in position to expose a numeral of the "odd" (upper) row indicating the playing of one side of a given record;

Figure 4 is a view similar to Figure 3 but showing the same parts in another position and exposing a numeral in the "even" (lower) row, indicating the playing of the opposite side of another record.

Figure 5 is a detail transverse sectional view taken substantially on the plane of the line 5—5 of Figure 3;

Figure 6 is a detail rear face view of the follower plate of the dial mechanism, showing in one relative position therebehind the shiftable indicator shutter utilized in the mechanism; and Figures 7 and 8 are rear perspective illustrations of the apertured follower plate and the indicator shutter of the preferred embodiment of the device.

Figure 1:
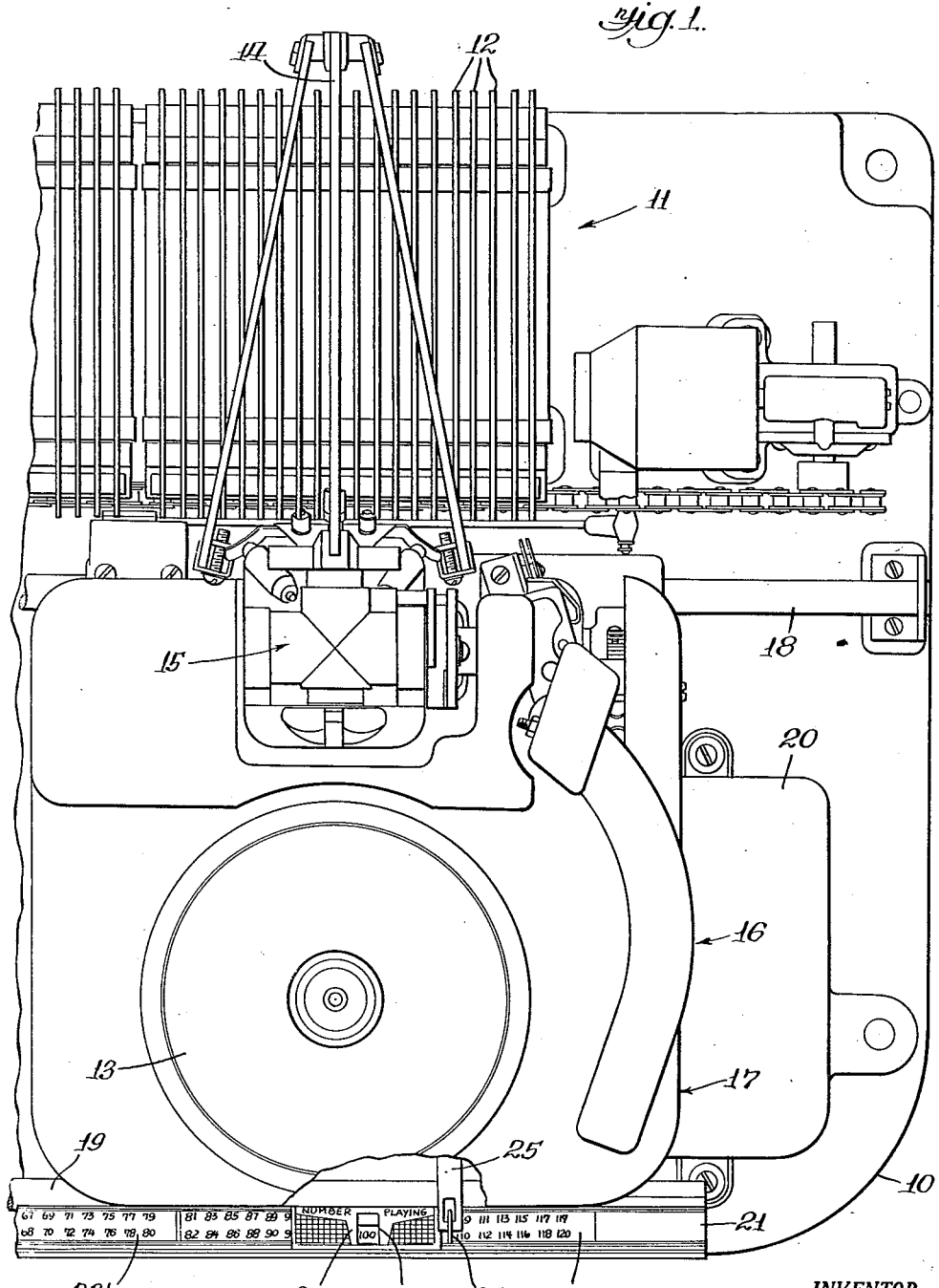
Figure 1 is a fragmental plan view of the record changing mechanism of an automatic phonograph, in combination with a mechanical annunciator according to the principles of the present invention.

Since the annunciator disclosed in this specification is particularly adapted to use in combination with an automatic phonograph, it is illustrated in a form specifically designed for the record changer of such a machine, and arranged to display either of two numerals associated with each record, thus giving an indication identifying the musical selections or other recording which is being played.

The various instrumentalities of the record changer illustrated are mounted on a common base 10 and are adapted to play either side of any phonographic record which may be selected from the record magazine generally designated as 11. The individual records 12 are carried to the turntable 13 by a semi-circular pickup arm 14 forming a part of a record transfer mechanism 15. The mechanism serves to place the individual records on the turntable with either face up, to play the desired selection. The mechanism employed to accomplish this and to place the stylus of a phonographic tone arm 16 in the groove of the record may be of the type shown and described in Vanderzee Patent No. 2,666,649, although in the present illustration the turntable, tone arm and record transfer mechanism are mounted on a common movable carriage generally designated as 17, with the entire carriage arranged to slide back and forth with respect to the record magazine. To accomplish this the carriage is mounted upon a pair of carriage guide rods 18 and 19. However, the relative movement between the carriage 17 and the record magazine 11 is utilized to cause the semi-circular record lifting arm 14 to move into registry with any one of the multiple records in the rack as in the aforementioned Vanderzee patent, and this relative movement between the record magazine and the transfer arm is controlled by a record selecting mechanism positioned below the carriage, at 20.

Thus the multiple individual record discs 12 which are stored in more or less regularly spaced relationship in the record magazine, may be individually and selectively lifted from their position in the magazine and placed on the turntable by the record transfer mechanism, which includes means for causing the record to be rotated a quarter turn in flight so that either side of the record may be placed uppermost on the turntable, as generally described in the Vanderzee patent.

The preferred form of annunciator illustrated in the present specification includes a longitudinally extending bar 21 mounted across the front of the record changing unit, with a channel 22 in the face of the bar. The channel 22 carries a dial consisting of one or more number strips 23. As seen in Figures 3 and 4, these number strips include two separate rows of numerals, with an "odd" and an "even" numeral for each record. The numerals in each row are spaced apart from each other distances corresponding to the spacing between the centers of the records in the magazine 11. Thus in the case of the sectional magazine illustrated wherein the records are grouped in magazine sections 11a, 11b and 11c with the distance between the end records in adjoining sections wider than normal, the numerals on the strips 23a, 23b and 23c are correspondingly spaced, leaving somewhat greater than normal spacing between numerals 39—41 and between 79—81 for example.

The annunciator channel 22 is shaped to receive a carriage follower or slide cover 24 which is slidable back and forth from end to end of the channel, moving above the number strips 23. The follower is, however, mechanically connected to the carriage 17 by an arm 25 having a bifurcated end portion extending outwardly from the carriage and engaging an upwardly turned tab or flange 26 on the follower plate.

The follower plate 24 has a central aperture 27 large enough to expose one numeral in both the upper and lower rows of numerals; that is, large enough to expose one numeral of the upper or "odd" row and the corresponding numeral of the lowermost "even" row at the same time. However, the follower 24 co-acts with a partially concealed shutter or indicator plate 28, which lies below the follower 24 and which also slides in the channel 22. The indicator 28, best shown in Figures 6 and 8, comprises a simple sheet metal plate adapted to lie beneath the follower plate 24 and to be carried back and forth therewith by a pair of short pins 29 and 30 depending from the underside of the follower plate. These pins engage a pair of open notches or apertures 31 and 32 in the indicator. The apertures 31 and 32 are considerably wider than the pins lying within them, however, so that as the carriage 17 of the record changer moves in either direction, the indicator lags slightly behind the follower. When movement of the carriage causes the arm 25 to draw the follower and indicator from left to right (Figure 3), the notch 31 comes into registry with the aperture 27 to open the upper half of that aperture and expose an "odd" numeral appearing in the upper row of the numeral strip. Upon reverse motion of the carrier of follower the pins 29—30 and notches 31—32 function as a lost motion connection between the follower and the indicator, so that the indicator again lags behind the follower, but on the opposite side thereof (Figure 4). The notch 32 now comes into registry with the lower half of the aperture 27 to expose an "even" numeral in the lower row. By this expedient the annunciator not only gives a direct reading as to the record selected, but gives a numerical indication as to whether it is the front or back face of the record (that is, the left or right face as viewed in Figure 1), so that the numerals which appear on the strips 23 properly correspond to the two selections on each record.

It follows that when the carriage moves leftwardly to the position of a given record, the upper numeral corresponding to that record will be exposed, while if the carriage arrives at the same position when moving from the left, the lowermost numeral will be exposed, and since the record selecting and transfer mechanism plays the front or reverse face of the records depending upon the relative direction of movement of the selector arm and magazine, the indicator provides a correct and accurate indication as to which selection on the record is being played.

From the foregoing, it will be apparent that the annunciator here disclosed provides an entirely dependable mechanism for accomplishing its intended purpose. It obviously completely eliminates and need for lights, relays, switches or conductors. At the same time, it provides an extremely simple, wholly mechanical device for giving a visual indication of the selection being played.

Having thus described my invention, what I claim and desire to secure by United States Letters Patent is:

1. In an automatic phonograph record changer having a multiple record magazine and a relatively movable transfer mechanism adapted to assume a position corresponding to any of the records therein, with means on the record transfer mechanism governed by the direction of relative movement of the record transfer mechanism in approaching the selected record to deposit the record on a phonograph turntable either face up; the combination of a mechanical record selection annunciator including a dial consisting of a numbered strip of a length corresponding to the effective length of the record magazine, said strip including two separate sets of numerals with the numerals of each set spaced apart from each other distances corresponding to the spacing of the records in the magazine; a follower slide shiftable along the dial with mechanical connections between said follower slide and the record changer mechanism whereby it is moved to a position corresponding to the position of a selected record, said follower slide having a shiftable device responsive to its relative direction of movement and shiftable between two positions to indicate the numerals in the one set in response to one direction of movement, and indicate the numerals in the other set in response to movement in the opposite direction.

2. In an automatic phonograph record changer including a multiple record magazine and a record transfer mechanism relatively shiftable in opposite directions with respect to each other whereby the record transfer mechanism may be brought into registry with any selected record from either side thereof, with means dependent upon the relative directions of approach to the record effective to determine the side thereof to be played; the combination of an annunciator comprising a dial having two separate sets of numerals, with the individual numerals in each set representing the selection recorded on corresponding sides of each of said records in the magazine and the individual numerals of the other set representing the selections on the other sides thereof; a follower mechanically actuated by the relative movement between said magazine and transfer mechanism, and adapted to move in either direction to a position corresponding to the position of any one of said records, a mechanical indicator shiftable along said dial and moved therealong by said follower, and a lost motion connection between said indicator and said follower whereby the indicator is brought into registry with a numeral in one set when brought into any indicating position from one direction, and is brought into registry with a numeral in the other set when brought to any indicating position from the opposite direction.

3. The combination according to the preceding claim wherein the follower consists of a longitudinally shiftable slide movable within a channel and covering a portion of the dial in said channel; the slide having an aperture adapted to expose one numeral of each set; and the mechanical indicator consists of a shutter between the slide and the dial with one aperture adapted for registry with the numerals of one set and another aperture adapted for registry with the numerals of the other set.

4. The combination of an annunciator dial comprising an elongated bar having a channel in the face thereof, with a numeral strip in said channel consisting of two parallel rows of numerals; a longitudinally shiftable slide movable within said channel and covering a portion of said numbered strip; the slide having an aperture of size and shape to expose one numeral in each of the parallel rows; an indicator shutter between the slide and the numeral strip having a pair of apertures, with one aperture adapted for registry with a numeral of one row and the other aperture adapted for registry with a numeral of the other row, and a lost motion connection between the slide and the indicator shutter adapted to permit either aperture of the shutter to move into registry with the aperture of the slide.

5. In an automatic phonograph record changer including a multiple record magazine and a record transfer mechanism relatively shiftable with respect to each other, the combination of a dial and an indicator relatively movable with respect to each other; said dial including two separate sets of indicia and said dial and indicator being relatively shiftable into two positions of registry corresponding to said separate sets of indicia; with mechanical connections from the record changer adapted to relatively move said dial and indicator, and to relatively shift said dial and indicator between their two positions of registry.

References Cited in the file of this patent
UNITED STATES PATENTS

| | | |
|---|---|---|
| 1,234,021 | Harrington et al. | July 17, 1917 |
| 2,299,348 | Rockola | Oct. 20, 1942 |
| 2,673,739 | Gierwiatowski | Mar. 30, 1954 |